US010502408B2

(12) United States Patent
Gasparini et al.

(10) Patent No.: US 10,502,408 B2
(45) Date of Patent: Dec. 10, 2019

(54) METHOD AND PLANT FOR CO-GENERATION OF HEAT AND POWER (71) Applicant: SASOL TECHNOLOGY PROPRIETARY LIMITED, Johannesburg (ZA)

(72) Inventors: Franco Gasparini, Milan (IT); Inida Papa, Milan (IT); Corné Welgemoed, Centurion (ZA)

(73) Assignee: SASOL TECHNOLOGY PROPRIETARY LIMITED, Johannesburg (ZA)

( * ) Notice: Subject to any disclaimer, the term of this patent is extended or adjusted under 35 U.S.C. 154(b) by 195 days.

(21) Appl. No.: 15/034,060

(22) PCT Filed: Oct. 31, 2014

(86) PCT No.: PCT/IB2014/065731
§ 371 (c)(1),
(2) Date: May 3, 2016

(87) PCT Pub. No.: WO2015/068087
PCT Pub. Date: May 14, 2015

(65) Prior Publication Data
US 2016/0273756 A1 Sep. 22, 2016

(30) Foreign Application Priority Data
Nov. 7, 2013 (ZA) .................................. 2013/08363

(51) Int. Cl.
F22B 1/18 (2006.01)
F22G 1/04 (2006.01)

(52) U.S. Cl.
CPC . F22B 1/18 (2013.01); F22G 1/04 (2013.01)

(58) Field of Classification Search
CPC .......... F01K 7/18; F01K 13/02; F01K 17/025; F01K 23/064; F22G 5/12; F22G 1/04; F22B 1/18; Y02P 80/15
See application file for complete search history.

(56) References Cited

U.S. PATENT DOCUMENTS 6,578,352 B2 * 6/2003 Morikawa ............. F01K 23/108
60/39.182
2007/0137204 A1 * 6/2007 Kjaer ....................... F01K 7/40
60/653

(Continued)

FOREIGN PATENT DOCUMENTS

DE 102010041964 A1 4/2012
EP 2199547 A1 * 6/2010 ............. F01K 23/10

(Continued)

Primary Examiner — Steven S Anderson, II
(74) Attorney, Agent, or Firm — Knobbe Martens Olson & Bear, LLP (57) ABSTRACT A method of operating a combined heat and power plant (10) (CHP plant) includes generating hot flue gas in a hot flue gas generator (12) and cooling the hot flue gas in a sequence of cooling steps to recover heat and to generate steam in a heat recovery steam generator (16) (HRSG). The HRSG (16) includes an HP steam evaporator (26) downstream of the hot flue gas generator (12) in which HP steam is generated and in which the hot flue gas is cooled, at least one HP steam superheater (20, 22) between the hot flue gas generator (12) and the HP steam evaporator (26) in which at least HP steam from the HP steam evaporator is superheated and in which the hot flue gas is cooled, and an MP steam superheater (24) upstream of the HP steam evaporator (26) in which MP steam is superheated by the hot flue gas and in which hot flue gas is cooled.

11 Claims, 2 Drawing Sheets (56) References Cited

U.S. PATENT DOCUMENTS

| | | | | |
|---|---|---|---|---|
| 2010/0263605 A1* | 10/2010 | Sengar | .................... | F22G 5/123 |
| | | | | 122/31.1 |
| 2010/0305768 A1 | 12/2010 | Holt et al. | | |
| 2013/0097993 A1* | 4/2013 | Raja | ......................... | F01K 7/18 |
| | | | | 60/39.182 |
| 2013/0098313 A1 | 4/2013 | Pang | | |

FOREIGN PATENT DOCUMENTS

| | | | | |
|---|---|---|---|---|
| EP | 2447484 A1 * | 5/2012 | ........... | F01K 23/101 |
| EP | 2584157 A1 | 4/2013 | | |
| WO | WO 2010/057222 A2 | 5/2010 | | |
| WO | WO 2010057222 A2 * | 5/2010 | ............... | C10G 2/30 |

* cited by examiner

METHOD AND PLANT FOR CO-GENERATION OF HEAT AND POWER

CROSS REFERENCE TO RELATED APPLICATIONS

This application is a U.S. National Phase Application of PCT International Application Number PCT/IB2014/065731, filed on Oct. 31, 2014, designating the United States of America and published in the English language, which is an International Application of and claims the benefit of priority to South African Patent Application No. 2013/08363, filed on Nov. 7, 2013. The disclosures of the above-referenced applications are hereby expressly incorporated by reference in their entireties.

This invention relates to the co-generation of heat and power. In particular, the invention relates to a method of operating a combined heat and power plant, and to a combined heat and power plant.

Processes and facilities for simultaneously producing heat (typically in the form of steam) and power (typically in the form of mechanical power produced by a steam or gas expansion turbine and/or electricity) are known. An example of such a plant is described in EP 2584157 A1. A plant for co-generating heat and power is often referred to as a combined heat and power plant (CHP plant).

It is also known to integrate a CHP plant with another facility, e.g. a hydrocarbon synthesis facility such as a Fischer-Tropsch synthesis facility, as taught in U.S. Pat. No. 6,673,845, WO 2007/009951 and WO 2010/057222, or a methanol synthesis plant. An article titled "Fresh air firing: HRSG guarantees steam supplies to French refinery" by Pascal Fontaine, based on a paper first delivered at Power-Gen Europe in Cologne, 2006, generally describes the steam integration of a CHP plant and a refinery (available at http://www.cospp.com/articles/print/volume-7/issue-5/project-profile/fresh-air-firing-hrsq-quarantees-steam-supplies-to-french-refinery.html). These documents all illustrate the use of a gas turbine together with a heat recovery steam generator (often referred to as a HRSG) for the production of heat and power in the CHP plant.

These co-generation or CHP processes or facilities typically include a gas turbine facility which includes a combustion chamber in which a hydrocarbon fuel is combusted and a gas expansion turbine or turbo-expander through which hot combustion gas, produced in the combustion chamber, is expanded. Typically, the gas expansion turbine is mechanically coupled to an electricity generator and/or to an air compressor or the like. Thus, expansion of the hot combustion gas produced in the combustion chamber provides mechanical power and/or generates electricity. The expanded hot combustion gas is typically routed through a heat recovery steam generator (HRSG) where the heat in the expanded hot combustion gas (low pressure exhaust gas) is recovered, e.g. as process heat and/or to raise steam and/or to superheat steam. The steam so produced is then typically used in one or more steam turbine driven electricity generators further to generate electricity, and/or steam turbine drives to produce mechanical power for rotating equipment such as compressors, and/or is used as process steam, e.g. in a facility integrated with the CHP plant, such as a refinery.

As also illustrated by the aforementioned documents, a typical HRSG includes, in series in a direction of flow of hot expanded combustion gas or hot expanded flue gas away from and downstream of the gas expansion turbine,
(I) a duct burner, which may be optional,
(II) at least one superheater for high pressure (HP) steam,
(III) a boiler or evaporator to produce the HP steam, and
(IV) a boiler feed water or condensate pre-heater or economiser to recoup low grade heat from the flue gas produced by the gas expansion turbine.

As illustrated by U.S. Pat. No. 6,673,845, the HRSG may also include a superheater for imported medium pressure (MP) steam downstream of the HP steam evaporator, typically upstream of the boiler feed water pre-heater or economiser. High pressure steam is typically imported into the HRSG from a synthesis gas generation stage, such as a reformer, e.g. an autothermal reformer, whereas MP steam is typical imported into the HRSG from a hydrocarbon synthesis facility, such as a Fischer-Tropsch synthesis facility.

For some CHP plants integrated with another chemical or petrochemical facility, e.g. a gas-to-liquids Fischer-Tropsch hydrocarbon synthesis facility, a relatively large amount of (imported) MP steam compared to imported HP steam and/or HRSG—produced HP steam, is available. Recovering heat from the hot expanded flue gas by transferring the heat to the heat sink provided by the imported MP steam, in an effective manner, then becomes an important issue, both from an operating cost perspective and from a capital cost perspective.

One approach to improve the quality of the MP steam by transferring as much heat to the MP steam as is practically possible, as taught by WO 2007/009951, is to use an expensive heat exchanger to superheat MP steam by heat exchange with HP steam. This is however costly from a capital cost perspective and may not work optimally if there is a large imbalance between HP steam and MP steam in the CHP plant.

A method of operating a combined heat and power plant, and a combined heat and power plant which can efficiently and at acceptable operating and capital costs recover heat from hot expanded flue gas by transferring the heat to MP steam would be desirable. Preferably, the method and plant should also cater for a situation in which there is a significant imbalance between HP steam and MP steam, e.g. when the MP steam available is significantly more than the HP steam available.

According to one aspect of the invention, there is provided a method of operating a combined heat and power plant (CHP plant), the method including
  generating hot flue gas in a hot flue gas generator;
  cooling the hot flue gas in a sequence of cooling steps to recover heat and to generate steam in a heat recovery steam generator (HRSG), the heat recovery steam generator including
  an HP steam evaporator downstream of the hot flue gas generator in which HP steam is generated and in which the hot flue gas is cooled;
  at least one HP steam superheater between the hot flue gas generator and the HP steam evaporator in which at least HP steam from the HP steam evaporator is superheated and in which the hot flue gas is cooled; and
  an MP steam superheater upstream of the HP steam evaporator in which MP steam is superheated by the hot flue gas and in which hot flue gas is cooled.

According to another aspect of the invention, there is provided a combined heat and power plant (CHP plant) which includes
  a hot flue gas generator generating hot flue gas;
  a heat recovery steam generator (HRSG) downstream of the hot flue gas generator to cool hot flue gas in a sequence of cooling steps to recover heat and to generate steam, the HRSG including an HP steam evaporator downstream of the hot flue gas generator to generate HP steam from heat recovered from the hot flue gas;

at least one HP steam superheater between the hot flue gas generator and the HP steam evaporator to superheat at least HP steam from the HP steam evaporator with heat recovered from the hot flue gas; and at least one MP steam superheater upstream of the HP steam evaporator to superheat MP steam with heat recovered from the hot flue gas.

In this specification, the relative positions of process equipment or process steps (e.g. upstream or downstream) are given in relation to the direction of flow of hot flue gas from the hot flue gas generator towards release of cooled flue gas from the HRSG (typically through a stack venting into the atmosphere). In other words, the relative positions are also along a continuously reducing temperature profile of the hot flue gas, typically dropping from hot (in excess of 460° C.) to sufficiently cold to make further heat recovery on an industrial scale uneconomical. It is also to be appreciated that the flow of hot flue gas from the hot flue gas generator to where cooled flue gas is released may be predominantly horizontal or predominantly vertical, or a combination of horizontal and vertical flow.

The CHP plant may be integrated, and in particular may be steam integrated, with another facility or plant, e.g. a hydrocarbon synthesis facility such as a gas-to-liquids Fischer-Tropsch hydrocarbon synthesis facility or a methanol synthesis facility.

In this specification, HP steam is intended to refer to steam which has a pressure in the range of about 34 bar(g) to about 120 bar(g). Preferably, the HP steam is at a pressure in the range of about 45 bar(g) and about 90 bar(g), more preferably in the range of about 65 bar(g) and about 70 bar(g), e.g. about 66 or 67 bar(g).

In this specification, MP steam is intended to refer to steam which has a pressure in the range of about 8 bar(g) to about 18 bar(g). Preferably, the MP steam is at a pressure in the range of about 8 bar(g) and about 16 bar(g), more preferably in the range of about 8 bar(g) and about 12 bar(g), e.g. about 10 bar(g).

Typically, the MP steam superheater is downstream of said at least one HP steam superheater.

The MP steam superheater upstream of the HP steam evaporator may provide superheated MP steam at a temperature in the range of from about 240° C. to about 350° C., preferably in the range of from about 240° C. to about 330° C., e.g. about 328° C.

The CHP plant may be configured to receive imported MP steam which is supplied to the MP steam superheater. The imported MP steam may be from a facility integrated with the CHP plant, or at least steam-integrated with the CHP plant, e.g. a facility operating an exothermic process such as a Fischer-Tropsch hydrocarbon synthesis process or a methanol synthesis process. The imported MP steam may be saturated MP steam. The MP steam may be so-called Fischer-Tropsch (FT) steam produced by cooling a Fischer-Tropsch hydrocarbon synthesis reactor.

The HRSG may include an MP steam superheater downstream of the HP steam evaporator.

The imported MP steam may be fed to the MP steam superheater downstream of the HP steam evaporator, before at least a portion thereof is fed to the MP steam superheater upstream of the HP steam evaporator.

The MP steam superheater downstream of the HP steam evaporator may provide MP steam at a temperature in the range of from about 210° C. to about 260° C., e.g. about 244° C.

The CHP plant may be configured to export superheated MP steam from the MP steam superheater downstream of the HP steam evaporator. Superheated MP steam from the MP steam superheater downstream of the HP steam evaporator may be exported to a facility integrated with the CHP plant, e.g. a product work-up section of a Fischer-Tropsch hydrocarbon synthesis plant integrated with the CHP plant.

The CHP plant may include at least one MP steam turbine fed with superheated MP steam from the MP steam superheater upstream of the HP steam evaporator.

In one embodiment of the invention, under normal operating conditions of the CHP plant and normal operating conditions (i.e. design flow sheet steady state operation) of a gas-to-liquids Fischer-Tropsch hydrocarbon synthesis facility steam-integrated with the CHP plant, a portion of the superheated MP steam from the MP steam superheater downstream of the HP steam evaporator is fed to the MP steam superheater upstream of the HP steam evaporator, for use in the MP steam turbine(s) and a portion of the superheated MP steam from the MP steam superheater downstream of the HP steam evaporator is exported. In other words, in this embodiment, a portion of the superheated MP steam is used for power generation and a portion is exported.

Typically however, the MP steam superheater upstream of the HP steam evaporator is fed with most, if not all, of the superheated MP steam from the MP steam superheater downstream of the HP steam evaporator. In one embodiment of the invention, under normal operating conditions of the CHP plant and normal operating conditions (i.e. design flow sheet steady state operation) of a gas-to-liquids Fischer-Tropsch facility steam-integrated with the CHP plant, substantially all of the superheated MP steam from the MP steam superheater downstream of the HP steam evaporator is fed to the MP steam superheater upstream of the HP steam evaporator, for use in the MP steam turbine(s). In other words, in this embodiment, superheated MP steam is not exported but is used exclusively for power generation.

The hot flue gas generator is typically in the form of at least one gas turbine facility which includes a combustion chamber in which a hydrocarbon fuel is combusted and a gas expansion turbine or turbo-expander through which hot combustion gas produced in the combustion chamber is expanded. The gas turbine facility may produce expanded hot flue gas at a temperature of at least 460° C., preferably at least 480° C., more preferably at least 500° C., e.g. about 501° C. Typically, the expanded hot flue gas temperature is no more than about 560° C.

It will be appreciated that the temperature of the hot expanded flue gas is determined by the temperature in the combustion chamber, as well as by the design of the expansion turbine.

The gas expansion turbine(s) may be drivingly connected to one or more compressors, e.g. one or more air compressors. The air compressor(s) may be arranged to provide compressed air to the combustion chamber. Instead or in addition, the air compressors may be arranged to export a portion of the air to a third party user thereof, e.g. to export air to an air separation unit.

The gas expansion turbine(s) may be drivingly connected to one or more electricity generators.

A large portion of the available heat in the expanded gas turbine flue gas is thus typically removed by any superheater or high temperature heat exchanger between the gas expansion turbine and the HP steam evaporator, and by the HP steam evaporator. Such superheaters or heat exchangers are used to superheat HP and MP steam, at least some of which may be imported from an integrated facility, such as a Fischer-Tropsch hydrocarbon synthesis facility. The large heat sink provided by the HP steam evaporator and by the high temperature heat exchangers, such as superheaters, upstream of the HP steam evaporator has the potential to lead to severe problems during start-up of the CHP plant and/or start-up of a facility integrated with the CHP plant, such as a Fischer-Tropsch hydrocarbon synthesis facility, and during a process upset in the integrated facility.

The start-up of an integrated facility, such as a Fischer-Tropsch hydrocarbon synthesis facility, typically demands electrical power and steam, with each typically incurring a peak demand at different stages of the start-up process. Thus, during the commencement of the start-up process for an integrated facility, a net steam demand exists from that integrated facility together with an electrical power demand. As will be appreciated, in order to sustain the electrical power demand of the integrated facility, the gas turbine of the CHP plant is required to operate close to its base load value. In other words, the CHP plant is brought up to normal operating conditions as soon as possible to supply the utility demands of the integrated facility which is to be started or which is being started. This results in the HRSG of the CHP plant being subjected to a very high heat load from an early stage. However, as there may be no or insufficient importation of a fluid from the integrated facility being started up to take up sufficient of the HRSG heat load upstream of the steam evaporator, e.g. insufficient imported process steam to be superheated upstream of the steam evaporator, the mechanical integrity of the HRSG may be at risk due for example to dry or under-supplied superheaters and subjection of heat exchange equipment and boiler feed water or condensate heaters or economisers downstream of the steam evaporator to a too high temperature. Although superheaters and other heat exchange equipment can be mechanically designed to withstand the high temperatures when running dry, this will come at a capital expense. Also, as a result of insufficient heat removal from the hot expanded flue gas upstream of the steam evaporator, more steam will be produced in the steam evaporator, with the result that the hydraulic limit of the HP steam evaporator may be exceeded.

A similar problem occurs when there is an upset in the integrated facility during normal operation, leading to a drastic reduction in the importation of a fluid from the integrated facility for heating or superheating in said one or more superheaters or other heat exchange equipment upstream of a steam evaporator. Again, this may result in possibly dry or under-supplied superheaters, overheating of other heat exchange equipment, or operation of a boiler feed water or condensate pre-heater or economiser at a too high temperature, and the exceeding of the hydraulic limit of the steam evaporator.

Although, during a process upset, it is possible to turn down the gas expansion turbine to reduce the heat load on the HRSG, this approach is often undesirable since stable base load operation is preferred for the gas expansion turbine and the CHP plant, e.g. from an electrical power production point of view if the integrated facility is based on an all or mostly electrical utility design (i.e. motive power, e.g. to drive pumps, compressors, blowers and the like is provided by electrical motors rather than by steam turbines in the integrated facility). It will be appreciated that, in a case where steam is used directly as the motive power in the integrated facility (i.e. directly in steam turbines for driving rotating equipment), a stable base load operation for the gas expansion turbine and the CHP plant and stable heat load on the HRSG to ensure stable steam production will be equally important, if not more important, as in the case in which an electrical utility design is employed.

The method of the invention may thus include, when HP steam is being imported to the HP steam superheater and when there is insufficient heat removal from the hot flue gas downstream from the hot flue gas generator but upstream of the HP steam evaporator as a result of insufficient mass flow of imported HP steam to the HP steam superheater, to the extent that the hot flue gas temperature downstream of the HP steam superheater will rise or rises to or above a predetermined limit, quenching steam inside the HP steam superheater or steam being fed to the HP steam superheater by injecting boiler feed water or condensate into said steam to produce steam in the HP steam superheater thereby to increase the removal of heat from the hot flue gas and hence to reduce the hot flue gas temperatures downstream of the HP steam superheater.

The method may include further superheating at least a portion of the HP steam produced in the HP steam superheater as a result of the quench.

The imported HP steam may be from any facility steam-integrated with the CHP plant at least to the extent that the steam-integrated facility exports steam to the CHP plant.

Also, the CHP plant may include a quench facility in flow communication with the HP steam superheater and with a supply of boiler feed water or condensate, the quench facility being configured to quench HP steam inside the HP steam superheater or HP steam being fed to the HP steam superheater by injecting boiler feed water or condensate into said HP steam to produce HP steam in the HP steam superheater thereby to increase the removal of heat from the hot flue gas and hence to reduce the hot flue gas temperatures downstream of the HP steam superheater.

The quench facility may be configured to quench HP steam inside the HP steam superheater or HP steam being fed to the HP steam superheater when there is insufficient heat removal from the hot flue gas downstream from the hot flue gas generator but upstream of the HP steam evaporator as a result of insufficient mass flow of imported HP steam to the HP steam superheater, to the extent that the hot flue gas temperature downstream of the HP steam superheater will rise or has risen to or above a predetermined limit.

Said predetermined limit may be a temperature above which the mechanical integrity of the HRSG is starting to be threatened or above which the hydraulic limit of the HP steam evaporator may be exceeded.

Insufficient heat removal from the hot flue gas downstream from the hot flue gas generator but upstream of the HP steam evaporator as a result of insufficient mass flow of imported HP steam to the HP steam superheater, to the extent that the hot flue gas temperature downstream of the HP steam superheater will rise or rises to or above a predetermined limit, may occur during start-up of a facility integrated with the CHP plant, e.g. a hydrocarbon synthesis facility such as a gas-to-liquids Fischer-Tropsch hydrocarbon synthesis facility or a methanol synthesis facility.

Instead, insufficient heat removal from the hot flue gas downstream from the hot flue gas generator but upstream of the steam evaporator as a result of insufficient mass flow of imported steam to the steam superheater, to the extent that the hot flue gas temperature downstream of the steam superheater will rise or rises to or above a predetermined limit may occur during a process upset in a facility integrated with the CHP plant, e.g. hydrocarbon synthesis facility such as a gas-to-liquids Fischer-Tropsch hydrocarbon synthesis facility or a methanol synthesis facility.

Said HP steam superheater may be a downstream HP steam superheater, with the CHP plant including a further, upstream HP steam superheater. The upstream HP steam superheater, when present, is thus upstream of the downstream HP steam superheater.

In this specification, "boiler feed water" is considered to be a supply of water of boiler feed quality from a source external to the CHP plant, e.g. from a hydrocarbon synthesis facility integrated with the CHP plant, whereas "condensate" is considered to mean a supply of water of boiler feed quality from within the CHP plant, e.g. a recycle of water of boiler feed quality, or of steam condensate internal to the CHP plant. Although boiler feed water specifications may differ from facility to facility, a person skilled in the art knows what the minimum requirements are to make water suitable for use as boiler feed water in a particular steam generation (i.e. temperature and pressure) application.

As will be appreciated, the CHP plant may thus produce superheated HP steam at at least two temperatures. A lower temperature superheated HP steam may be in the range of between about 380° C. and about 550° C., preferably between about 400° C. and about 450° C., e.g. about 411° C. This lower temperature superheated HP steam is thus typically produced by the downstream HP steam superheater.

The CHP plant may export lower temperature superheated HP steam, e.g. to be used in an endothermic process of a facility integrated with the CHP plant or to another user of superheated HP steam, e.g. an oil refinery.

In one embodiment of the invention, lower temperature superheated HP steam is exported to a reformer facility in which a hydrocarbon feed stream, e.g. natural gas, methane rich gas or methane containing raw synthesis gas from a coal gasifier, is endothermically reformed or exothermically partially oxidised in the presence of said exported superheated HP steam to provide synthesis gas with a desired $H_2$ to CO ratio. The reformer facility may include an autothermal reformer, a partial oxidation reformer, a catalytic partial oxidation reformer or a steam methane reformer (e.g. a pre-reformer, a fuel gas fired primary reformer, or a Haldor Topsøe Exchange Reformer (trade name) provided by Haldor Topsøe A/S, Denmark), or the reformer facility may be a two-stage reformer facility including an autothermal reformer and a gas heated steam reformer, e.g. in a series configuration, with hot synthesis gas from the autothermal reformer being used to heat the gas heated steam reformer and with the gas heated steam reformer reforming a hydrocarbon stream to provide an intermediate synthesis gas stream which is then fed to the autothermal reformer to produce synthesis gas, e.g. for hydrocarbon synthesis.

Alternatively, the reformer facility may be a two-stage reformer facility including an autothermal reformer and a gas heated steam reformer, e.g. in a parallel configuration, wherein the hydrocarbon feed stream is routed to the autothermal reformer and the gas heated steam reformer in parallel, with the hot synthesis gas from the autothermal reformer being used to heat the gas heated steam reformer, and wherein the hot synthesis gas from the autothermal reformer and synthesis gas from the gas heated steam reformer are combined to produce a synthesis gas, e.g. for hydrocarbon synthesis.

A higher temperature superheated HP steam may be in the range of between about 450° C. and about 550° C., preferably between about 470° C. and about 520° C., e.g. about 500° C. Naturally, the higher temperature superheated HP steam will be at a higher temperature than the lower temperature superheated HP steam. This higher temperature superheated HP steam is thus typically produced by the upstream HP steam superheater.

In the CHP plant, the higher temperature superheated HP steam may be fed to an HP steam turbine to generate mechanical power or electricity. In one embodiment of the invention, the HP steam turbine is thus drivingly connected to an electricity generator to generate electricity.

The HP steam turbine may be a back-pressure (i.e. non-condensing) steam turbine.

Typically, the CHP plant includes a plurality of HP steam turbines and electricity generators.

The mass ratio of HP steam fed to the HP steam turbine of the CHP plant, to HP steam exported from the CHP plant, may be in the range of from about 0 (i.e. no HP steam is fed to the steam turbine and at least some HP steam is exported from the CHP plant) to about 1:10. It will be appreciated that, in the embodiment of the invention in which superheated HP steam is exported to a reformer facility, as steam requirement in the reformer facility is decreased, e.g. as a result of reformer technology improvements, more steam may be fed to the HP steam turbine of the CHP plant relative to HP steam exported from the CHP plant and the mass ratio may increase.

The HP steam superheater, or the downstream HP steam superheater when more than one HP steam superheater is present, may include at least two HP steam superheater sections, e.g. two banks of superheater coils or tubes or the like, with one HP steam superheater section being an upstream HP steam superheater section and the other HP steam superheater section being a downstream HP steam superheater section.

The quench facility may be in flow communication with the downstream HP steam superheater. Liquid water, i.e. boiler feed water or condensate may thus be injected into the downstream HP steam superheater, when required. The boiler feed water or condensate may be injected into the upstream HP steam superheater section to the exclusion of any injection of liquid water into the downstream HP steam superheater section.

The method may include injecting sufficient liquid water, i.e. boiler feed water or condensate into the HP steam superheater to reduce the HP steam temperature to no closer than about 5° C. to about 20° C., e.g. about 10° C. above the saturation temperature of the HP steam.

The method may include injecting sufficient boiler feed water or condensate into the HP steam superheater to ensure that the expanded hot flue gas immediately downstream of the HP steam superheater is at a temperature of no more than about 440° C., preferably no more than about 430° C. It will be appreciated that the temperature of the expanded hot flue gas immediately downstream of the HP steam superheater may be varied according to the design mechanical limit of heat exchange equipment, e.g. where more heat resistant alloys are used, the temperature may be allowed to increase, e.g. up to about 800° C.

The method may include injecting sufficient boiler feed water or condensate into the HP steam superheater to ensure that HP steam generated by the HP steam superheater from the injected boiler feed water or condensate has a superheated temperature in the range of from about 380° C. to about 550° C., e.g. about 500° C.

The CHP plant may be configured to receive imported HP steam into the HP steam superheater, in addition to HP steam generated by the HP steam evaporator. Typically, the imported HP steam is saturated HP steam. The imported HP steam may be fed to the HP steam superheater or to the downstream HP steam superheater, as the case may be, together with HP steam from the HP steam evaporator.

The mass ratio of HP steam imported into the CHP plant to HP steam produced in the HP steam evaporator under normal operating conditions of the CHP plant may be in the range of from about 1:1 to about 17:1. Typically, under normal operating conditions of the CHP plant, the mass ratio of HP steam imported into the CHP plant to HP steam produced in the HP steam evaporator is about 4:1.

By "normal operating conditions" of the CHP plant is meant that the CHP plant is at a condition in which it is satisfying at least its design base load demand, thus running at a steady state producing heat and power continuously according to its design base load flow sheet.

The imported HP steam may be from a facility integrated with the CHP plant, e.g. a Fischer-Tropsch hydrocarbon synthesis facility. The imported HP steam may be generated by a waste heat boiler of a reformer facility in which a hydrocarbon feed stream is reformed to provide reformed gas or synthesis gas. In other words, the imported HP steam may be produced by cooling of reformed or synthesis gas. The reformer facility from which the HP steam is imported may be the same reformer facility to which the CHP plant exports superheated HP steam for reforming purposes.

Preferably, the mass ratio of HP steam imported into the CHP plant to HP steam produced in the HP steam evaporator should be as high as possible (i.e. a majority of HP steam should be imported into the CHP plant) and the ratio may increase as reforming technology developments allow for the export of less HP steam to the reformer facility and thus a correspondingly higher import of HP steam into the CHP plant.

The HRSG may include a duct burner downstream of the expanded hot flue gas generator and upstream of the HP steam superheater. The duct burner may be supplied with a gaseous and/or liquid fuel for supplementary firing. During operation, the duct burner may increase the temperature of the hot flue gas to a temperature in the range of from 460° C. to 800° C., so as to achieve desired steam superheat temperatures. In transient conditions, such as during start-up or in the case of a process upset, the duct burner may be used to increase the temperature of the hot flue gas even further than it does during normal operation of the CHP plant so as to enable the generation of even more additional steam by way of injecting said liquid water quench into the HP steam superheater upstream of the HP steam evaporator.

The method may include injecting sufficient boiler feed water or condensate into the HP steam superheater to ensure that the MP steam superheater upstream of the HP steam evaporator is not subjected to hot flue gas at a temperature above a temperature design limit of the MP steam superheater. Preferably, the MP steam superheater is subjected to hot flue gas at a temperature which is no more than about 440° C., preferably no more than about 430° C.

The MP steam turbine may be drivingly connected to an electricity generator. The MP steam turbine may be a condensing turbine. The back-pressure of the HP steam turbine may be set by the pressure of the superheated MP steam being fed to the MP steam turbine. In the CHP plant, exhaust superheated MP steam produced by the HP steam turbine may thus be blended with superheated MP steam from the MP steam superheater upstream of the HP steam evaporator and fed to the MP steam turbine.

Typically, the CHP plant includes a plurality of MP steam turbines and electricity generators. Optionally, the CHP plant and/or a facility integrated with the CHP plant, e.g. a hydrocarbon synthesis facility may include one or more MP steam driven compressors. In other words, MP steam may be used as a motive fluid to drive compressors or other rotating equipment in the facility integrated with the CHP plant or in the CHP plant. The MP steam used in one or more of such MP steam turbines may be superheated MP steam from the CHP plant, saturated MP steam from the facility integrated with the CHP plant, or a combination thereof.

The still superheated exhaust MP steam from the HP steam turbine may be at a lower temperature than the superheated MP steam from the MP steam superheater upstream of the HP steam evaporator.

The HP steam turbine, or all of the HP steam turbines combined, and the MP steam turbine, or all of the MP steam turbines combined, as the case may be, may be sized so that the ratio of power produced by the HP steam turbine(s), to power produced by the MP steam turbine(s), is in the range of from about 1:1, to about 1:66. As a result of the severe imbalance between HP steam flow and MP steam flow in at least some embodiments of the invention (e.g. in those embodiments of the invention in which there is significant MP steam import into the CHP plant), the CHP plant in such embodiments does not employ a dual-stage HP steam turbine receiving both HP steam and MP steam, but rather employs separate HP steam turbine(s) and separate MP steam turbine(s).

The HRSG may include a low pressure (LP) steam evaporator downstream of the HP steam evaporator to generate LP steam. Typically, the LP steam evaporator is downstream of the MP steam superheater that is also downstream of the HP steam evaporator.

In this specification, LP steam is intended to refer to steam which has a pressure in the range of from about 2 bar(g) to about 8 bar(g). Preferably, the LP steam is at a pressure in the range of from about 4 bar(g) to about 7 bar(g), more preferably in the range of from about 4 bar(g) to about 5 bar(g), e.g. about 4.5 bar(g).

The HRSG may include an LP steam superheater upstream of the LP steam evaporator. The LP steam superheater may be between the HP steam evaporator and the MP steam superheater downstream of the HP steam evaporator.

The LP steam superheater may provide superheated LP steam at a temperature in the range of from about 200° C. to about 260° C., e.g. about 251° C.

In the CHP plant, superheated LP steam may be fed to an LP steam turbine, or to an LP stage of the MP steam turbine. The MP steam turbine may thus be a multi-stage, e.g. a dual-stage steam turbine. Preferably, superheated LP steam is used to generate electricity in the CHP plant. In a preferred embodiment, the superheated LP steam is fed to the LP stage of such a dual-stage steam MP steam turbine receiving predominantly superheated MP steam.

The mass ratio of LP steam fed to the MP steam turbine to MP steam fed to the MP steam turbine may be in the range of from about 1:1 to about 1:28.

As indicated hereinbefore, the MP steam turbine may be a condensing turbine. Similarly, when an LP steam turbine is provided instead of a multi-stage MP steam turbine, the LP steam turbine may be a condensing turbine. Steam from the MP steam turbine (and/or from said LP steam turbine if present) may be condensed under vacuum, e.g. using an air condenser.

The method may include, when there is insufficient heat removal from the hot flue gas downstream from the hot flue gas generator but upstream of the HP steam evaporator as a result of insufficient mass flow of imported steam to the HP steam superheater, to the extent that the hot flue gas temperature downstream of the HP steam superheater will rise or rises to or above a predetermined limit, feeding steam from the LP steam evaporator into the MP steam superheater upstream of the HP steam evaporator. The steam from the LP steam evaporator may be fed via the LP steam superheater downstream of the HP steam evaporator.

The LP steam evaporator may be designed to generate steam at least over a pressure range of from about 2 bar(g) to about 18 bar(g) and the LP steam evaporator may be provided with a control system selectably settable to control the pressure of the LP steam evaporator so that either LP steam or MP steam within said pressure range of from 2 bar(g) to 18 bar(g) is generated by the LP steam evaporator.

As will be appreciated, this unusually or unconventionally large pressure range allows production of both LP steam during normal operating conditions of the CHP plant, and production of MP steam during a period when no or insufficient MP steam is being imported to the CHP plant, e.g. during start-up of a facility integrated with the CHP plant, e.g. a gas-to-liquids Fischer-Tropsch hydrocarbon synthesis facility, or during a process upset in such a facility.

The method may thus include, when the HRSG includes a low pressure (LP) steam evaporator downstream of the HP steam evaporator to generate LP steam and when no or insufficient MP steam is being imported to the MP steam superheater to ensure safe operation of the MP steam superheater, and/or when a demand exists for exporting MP steam which cannot be satisfied by imported MP steam superheated in the MP steam superheater, and/or when a demand exists for MP steam in the CHP plant which cannot be satisfied by imported MP steam, operating the LP steam evaporator at an operating pressure in the range of between about 8 bar(g) and about 18 bar(g) to generate MP steam to wet the MP steam superheater and/or to satisfy at least to some extent said demand for MP steam; and thereafter, when sufficient MP steam is being imported to the MP steam superheater from external of the CHP plant to ensure safe operation of the MP steam superheater, and/or when any demand for exported MP steam is satisfied by imported MP steam which is superheated in the MP steam superheater and then exported, and/or when there is no more demand for exporting of MP steam, and/or when the demand for MP steam in the CHP plant is being satisfied at least to some extent by imported MP steam, reducing the operating pressure of the LP steam evaporator to a pressure in the range of between about 2 bar(g) and about 8 bar(g) thereby to generate LP steam.

When the LP steam evaporator is producing MP steam, some of the MP steam may be let down to provide LP steam. The LP steam generated during start-up may be used for heating, steam tracing and other general LP steam utility usage. Typically however, as insufficient MP steam will be available initially during start-up to drive even one MP steam turbine, LP steam will not be used in the MP steam turbine initially. It may thus be necessary to dump LP steam during start-up.

The CHP plant may be configured to let HP steam down to provide MP steam. This may be required during start-up of a facility integrated with the CHP plant, e.g. a gas-to-liquids Fischer-Tropsch hydrocarbon synthesis facility, or during a process upset in the facility integrated with the CHP plant. Producing MP steam in the LP evaporator thus supplements any start-up MP steam demand of the facility integrated with the CHP plant thereby alleviating the steam generation requirement for the HP steam evaporator during normal start-up of such an integrated facility. As will be appreciated, generation of MP steam in the LP steam evaporator decreases a requirement for desuperheating HP steam to provide MP steam, allowing more efficient use of steam during start-up.

Generation of MP steam in the LP steam evaporator also advantageously allows power production from the HP steam turbine during start-up faster than when LP steam only is generated in the LP steam evaporator, as more HP steam is available sooner for the HP steam turbine(s).

Typically, the HP steam turbines are significantly smaller than the MP steam turbines. One can thus expect one or more of the HP steam turbines to be the first of the steam turbines to generate electricity during start-up. Generation of MP steam in the LP steam evaporator advantageously allows power production from one or more of the MP steam turbines during start-up sooner than when LP steam only is generated in the LP steam evaporator, as more MP steam is available faster for the MP steam turbine(s) once MP steam is starting to be imported into the CHP plant.

The method may include, during start-up of a facility integrated with the CHP plant, setting a control pressure for the LP steam evaporator to a pressure sufficiently high to produce MP steam, e.g. about 12 bar(g).

The method may include, once sufficient imported MP steam is available to drive at least one MP steam turbine, reducing the control pressure for the LP steam evaporator to a pressure suitable for LP steam production, e.g. 4.5 bar(g), and feeding imported MP steam and LP steam produced by the HRSG to the multi-stage MP steam turbine. The method may then include blowing off or condensing steam from the LP steam evaporator until the pressure of the LP steam evaporator has reduced to the LP steam set point pressure, before feeding the LP steam to a low pressure stage of the MP steam turbine. The MP steam produced by the LP steam evaporator may be blown off into an LP steam header of a facility integrated with the CHP plant, e.g. the LP steam header of a gas-to-liquids Fischer-Tropsch hydrocarbon synthesis plant integrated with the CHP plant. Advantageously, in this fashion, condensate is not lost during MP steam blow-off but is recovered in the LP steam system of the facility integrated with the CHP plant.

Typically, pumping of boiler feed water or condensate to the LP steam evaporator is used to regulate the water level in a steam drum of the LP steam evaporator. The CHP plant may thus include a feed pump for pumping condensate (and/or boiler feed water) to the LP steam evaporator. The feed pump may have a variable speed drive to allow the feed pump to vary condensate or boiler feed water flow rate as steam production in the LP steam evaporator increases or decreases and to react to the change in pressure in the LP steam evaporator, thereby to regulate the water level in a drum of the LP steam evaporator.

The HRSG typically includes at least one economiser or condensate or boiler feed water pre-heater to pre-heat condensate or boiler feed water being fed to the HP steam evaporator and/or the LP steam evaporator.

The economiser(s) typically receive(s) condensate from a condenser of the MP steam turbine. Typically, the CHP plant requires no boiler feed water or condensate make-up during steady state operation, bearing in mind the importation of HP steam and/or MP steam into the CHP plant and the subsequent condensation thereof in the CHP plant.

A facility integrated with the CHP plant may be a net producer of HP steam and/or MP steam. In contrast, the CHP plant is typically a net consumer of HP and/or MP steam.

The CHP plant may be configured to produce at least 40%, preferably at least 50%, more preferably at least 55%, most preferably at least 60% of all power produced by the CHP plant, by means of steam turbines driving electrical generators. The balance of the power requirements may then be produced predominantly, if not exclusively, by one or more of said gas expansion turbines driving one or more electricity generators, and/or driving other rotary equipment such as an air compressor.

The CHP plant may, instead of or in addition to being configured to produce electrical power by means of steam turbines driving electrical generators, be configured to produce mechanical power by means of direct steam drives, e.g. by means of steam turbine compressor drives.

Optionally, the CHP plant may be configured to produce a surplus of power from the one or more electrical generators, which surplus power may be exported to a third party user.

The invention will now be described, by way of example, with reference to the diagrammatic drawings and the Example.

Figure 1:
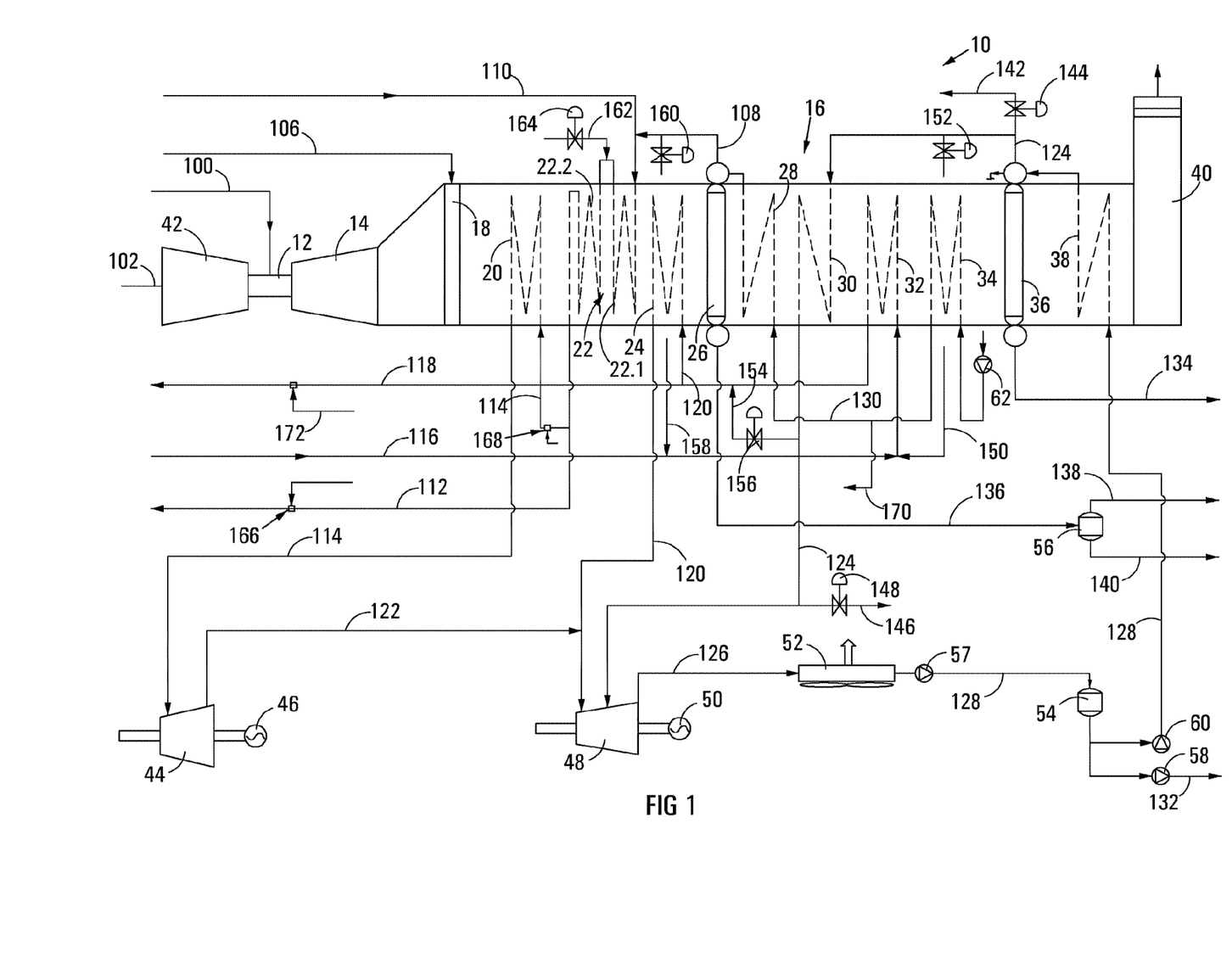
FIG. 1 shows a CHP plant in accordance with the invention.

Referring to FIG. 1 of the drawings, reference numeral 10 generally indicates a CHP plant in accordance with the invention. In the embodiment of the invention illustrated in FIG. 1, the CHP plant 10 is steam-integrated with a 96000 barrels per day gas-to-liquids Fischer-Tropsch hydrocarbon synthesis plant or facility (not shown).

The Fischer-Tropsch hydrocarbon synthesis facility is conventional and includes a Heat Exchange Reformer (HER), e.g. a Haldor Topsøe Exchange Reformer (trade name), forming part of a synthesis gas generation section in which a hydrocarbon feed stream, e.g. natural gas, is combusted with oxygen and steam to reform the gas, the reformed gas typically being at about 900° C. to 1100° C., with cooling of the reformed gas producing saturated HP steam, slurry bubble column Fischer-Tropsch hydrocarbon synthesis reactors forming part of a hydrocarbon synthesis section in which a slate of hydrocarbons is produced, with cooling of the reactors generating saturated MP steam (so-called FT steam), and a product work-up section to separate and upgrade the slate of hydrocarbons produced, none of which is shown in the drawings. In order to achieve an economic and efficient alternative to a standard steam based utility design, an all electrical design is selected for the gas-to-liquids facility integrated with the CHP plant 10, using combined cycle (Brayton & Rankine cycle) technology by means of industrial gas turbines and steam turbine generators in the CHP plant 10.

The CHP plant 10 includes a hot flue gas generator in the form of a combustion chamber 12, a gas expansion turbine 14 and an air compressor 42 mechanically coupled to the gas expansion turbine 14 so that the air compressor 42 is driven by the gas expansion turbine 14. The gas expansion turbine 14 is arranged to exhaust into a heat recovery steam generator (HRSG) generally indicated by reference numeral 16.

The HRSG 16 includes, arranged from an upstream end thereof to a downstream end thereof relative to horizontal flow of hot flue gas, in series, a duct burner 18, an upstream HP steam superheater 20, a downstream HP steam superheater 22, an upstream MP steam superheater 24, an HP steam evaporator 26, an upstream condensate preheater or economizer 28, an LP steam superheater 30, a downstream MP steam superheater 32, a condensate preheater or economizer 34, an LP steam evaporator 36, a downstream condensate preheater or economizer 38, and a flue gas stack 40 to vent cooled flue gas into the atmosphere, as shown by an arrow 174.

The CHP plant 10 further includes an HP steam turbine 44 drivingly connected to an electricity generator 46, an dual stage condensing MP steam turbine 48 drivingly connected to an electricity generator 50, an air condenser 52, a condensate drum 54 and an HP condensate flash drum 56. Condensate pumps 57, 58, 60 and 62 are also provided.

As can be seen in FIG. 1, the downstream HP steam superheater 22 includes a downstream HP steam superheater section 22.1 and an upstream HP steam superheater section 22.2. The downstream HP steam superheater 22 thus includes two separate and distinct heat exchange sections 22.1, 22.2 each comprising a bank of heat transfer elements such as coils or tubes.

A fuel line 100 leads to the combustion chamber 12, whereas an air inlet line 102 leads to the air compressor 42. The duct burner 18 is also provided with a fuel line 106.

An HP steam line 108 from the HP steam evaporator 26 (in fact from a steam drum of the HP steam evaporator 26) joins an HP steam import line 110. A superheated HP steam export line 112 leads from the downstream HP steam superheater 22. An HP steam turbine feed line 114 branches off from the superheated HP steam export line 112 and leads to the upstream HP steam superheater 20 and then leads from the upstream HP steam superheater 20 to the HP steam turbine 44.

An MP steam import line 116 leads to the downstream MP steam superheater 32. A superheated MP steam export line 118 leads from the downstream MP steam superheater 32. An MP steam turbine feed line 120 branches off from the superheated MP steam export line 118 and leads to the upstream MP steam superheater 24 and from the upstream MP steam superheater 24 to the MP steam turbine 48. The MP steam turbine feed line 120, between the upstream MP steam superheater 24 and the MP steam turbine 48, is joined by an HP steam turbine exhaust line 122.

An LP steam line 124 leads from the LP steam evaporator 36 (in fact from a steam drum of the LP steam evaporator 36) to the LP steam superheater 30 and from the LP steam superheater 30 to a low pressure stage of the MP steam turbine 48.

An MP steam turbine exhaust line 126 leads from the MP steam turbine 48 to the air condenser 52. From the air condenser 52, a condensate line 128 leads to the condensate drum 54 via the condensate pump 57 and from the condensate drum 54 to the economizer 38, via the condensate pump 60, to enter the LP steam evaporator 36. A condensate export line 132 also leads from the condensate drum 54, via the condensate pump 58.

A condensate line 130 leads from the LP steam evaporator 36, via the condensate pump 62, to the economizer 34 and from the economizer 34 to the economizer 28, before entering the HP steam evaporator 26.

The LP steam evaporator 36 has a blowdown line 134 and the HP steam evaporator 26 as a blowdown line 136. The blowdown line 136 leads into the HP condensate flash drum 56, from where a blowdown steam export line 138 and a blowdown condensate export line 140 lead.

The LP steam line 124 is provided with an LP steam blow off line 142 with a valve 144 before the LP steam superheater 30 as well as an LP steam blow off line 146 with a valve 148 after the LP steam superheater 30.

A steam transfer line 150 with a valve 152 extends between the LP steam line 124 (from between the LP steam evaporator 36 and the LP steam superheater 30) to the MP steam import line 116. Similarly, a steam transfer line 154, with a valve 156, leads from the superheated LP steam line 124 (from between the LP steam superheater 30 and the MP steam turbine 48) to the superheated MP steam export line 118.

A steam transfer line 158 with a valve 160 leads from the HP steam line 108 to the MP steam import line 116.

A quench line 162 with a valve 164 leads to the downstream HP steam superheater 22, between the downstream HP steam superheater section 22.1 and the upstream HP steam superheater section 22.2. The quench line 162 thus supplies condensate as a quench liquid to the HP steam superheater section 22.2, but not to the HP steam superheater section 22.1.

The CHP plant 10, as illustrated, is used to generate heat (in the form of steam) and power, in the form of mechanical and electrical power. The air compressor 42, driven by the gas expansion turbine 14, is used to provide compressed air at about 12 bar(g) to the combustion chamber 12. Thus, during normal use and steady state operation, a mixture of Fischer-Tropsch tail gas and methane-rich gas (about 715 MW on a lower heating value (LHV) basis), typically provided by the Fischer-Tropsch hydrocarbon synthesis plant integrated with the CHP plant 10, is fed by means of the fuel line 100 to the combustion chamber 12 where the mixture is combusted at a pressure of about 11 bar(g) and a high temperature (well in excess of 1000° C.) in the presence of the air fed by means of the air compressor 42. The hot combusted gas is expanded through the gas expansion turbine 14 to almost atmospheric pressure, with the gas expansion turbine 14 in turn driving the air compressor 42, drawing in ambient air through the air inlet line 102. In the embodiment illustrated in FIG. 1, almost 3000 ton/hour of air is compressed to a pressure of about 12 bar(g) and fed to the combustion chamber 12. Although not shown in FIG. 1, the gas expansion turbine 14 is also mechanically coupled to an electricity generator producing about 244 MW of electrical power.

Hot flue gas from the gas expansion turbine 14 leaves the gas expansion turbine 14 at a temperature of about 501° C.

The duct burner 18 is used further to heat the hot flue gas from the gas expansion turbine 14. The duct burner 18 combusts a mixture of methane-rich gas and liquid fuel (about 6.5 ton/hour) supplied by means of the fuel line 106. This duct burning, when used, drives the temperature of the hot flue gas up to about 526° C.

An important contributor to the efficiency of the CHP plant 10 is the degree of superheat of both the HP and MP steam systems. In general, it is more efficient to convert heat into superheat than it is to produce steam. The temperature of the hot flue gas from the gas expansion turbine 14 alone is not sufficiently high to achieve the desired degree of superheat, e.g. in the embodiment illustrated the desired degree of superheat is approximately 200° C. for superheated HP steam. Therefore, supplementary firing with the duct burner 18 is required to increase the temperature of the hot flue gas so as to provide a sufficiently large temperature driving force to achieve the desired degree of superheat for HP steam.

Supplementary firing by the duct burner 18 also gives the added advantage of maintaining the base load of the CHP plant 10 during trips and upset conditions of the gas-to-liquids Fischer-Tropsch hydrocarbon synthesis plant or facility steam-integrated with the CHP plant 10. This is accomplished by modulating the firing capacity of the duct burner 18 either to increase the degree of superheat in the superheated steam (HP and MP and/or LP steam), or to produce more steam when required using the quench facility provided by the invention. The duct burner 18 also functions as a sink to any surplus process off-gas that may exist in the CHP plant 10, or said hydrocarbon synthesis facility integrated with the CHP plant 10. A further important feature of supplementary firing with the duct burner 18 is that it provides an increase in availability of the HRSG 16 during a trip of the gas expansion turbine 14. Supplementary firing by way of the duct burner 18 can maintain the HRSG 16 in operation during a trip of the gas turbine 14 by allowing the intake of fresh air (not shown in FIG. 1), i.e. the HRSG 16 can then operate as an independent fired superheater. Typically, supplementary firing by the duct burner 18 is not required during start-up; it is only implemented during normal operation.

Figure 2:
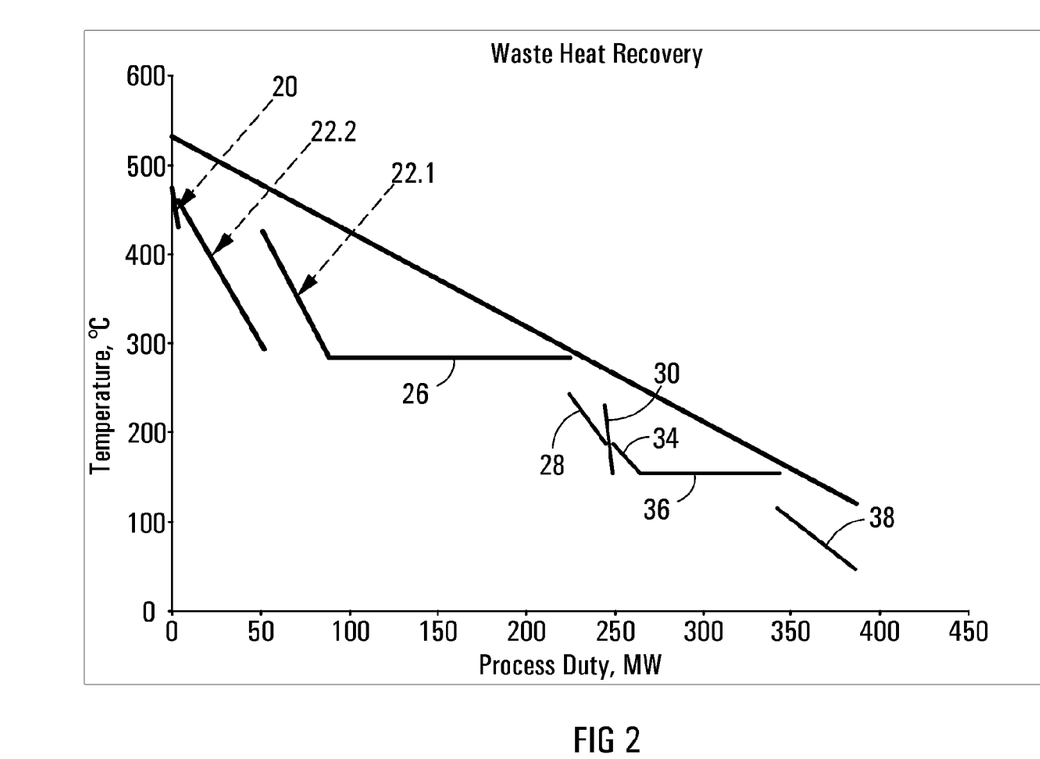
FIG. 2 shows graphs of heat recovery (in MW) vs. temperature change (in ° C.) for media (steam or condensate) heated in an HRSG of the CHP plant of FIG. 1 and temperature profile of expanded hot flue gas (downstream of a duct burner in the HRSG) from which heat is recovered in the HRSG of the CHP plant of FIG. 1, in the event of quenching of an HP steam superheater in accordance with the method of the invention during start-up of a Fischer-Tropsch hydrocarbon synthesis plant integrated with the CHP plant.

As illustrated in FIG. 2 (which reflects the situation during start-up of the Fischer-Tropsch hydrocarbon synthesis plant integrated with the CHP plant 10, the hot flue gas is then cooled in the HRSG 16, in a series of cooling steps, until it is vented to atmosphere through the flue gas stack 40 at a temperature in the region of about 122° C. In FIG. 2, the same reference numerals as used in FIG. 1 have been used to identify the heat exchange unit operations of the HRSG 16.

Referring again to FIG. 1 of the drawings, important in the context of the invention, about 400 ton/hour of saturated HP steam at a pressure of about 68 bar(g) is imported from the Fischer-Tropsch hydrocarbon synthesis facility, more specifically from the waste heat boiler of the reformer of the Fischer-Tropsch hydrocarbon synthesis facility, by means of the HP steam import line 110. The saturated imported HP steam in line 110 is joined by about 110 ton/hour of saturated HP steam produced by the HP steam evaporator 26 via the HP steam line 108. All of the combined saturated HP steam is then superheated in the downstream HP steam superheater 22 to a temperature in excess of 400° C., e.g. about 425° C. A portion of the superheated HP steam from the downstream HP steam superheater 22 is then attemperized or partially desuperheated by injection of condensate as shown at 166 and exported at a temperature of about 411° C. and a pressure of about 67 bar(g). In the embodiment illustrated in FIG. 1, the steam exported by means of the HP steam export line 112 is fed to the reformer of the Fischer-Tropsch hydrocarbon synthesis facility integrated with the CHP plant 10.

Another portion of the superheated HP steam from the downstream HP steam superheater 22 is attemperized or partially desuperheated with condensate to a temperature of about 419° C., as indicated at 168 and further superheated in the upstream HP steam superheater 20 to a temperature of about 500° C. About 50 ton/hour of 66 bar(g) HP steam at a temperature of 500° C. is then fed to the HP steam turbine 44 by means of the HP steam turbine feed line 114 to generate about 4.9 MW of electricity by means of the electricity generator 46. The HP steam turbine 44 is a back-pressure steam turbine with the back-pressure of the HP steam turbine 44 being set by the pressure of the MP steam being fed to the MP steam turbine 48 by means of the MP steam turbine feed line 120. Back-pressure MP steam at a pressure of about 10 bar(g) and a temperature of about 301° C. is thus fed by means of the HP steam turbine exhaust line 122 to the MP steam turbine feed line 120.

Saturated MP steam at a pressure of about 11 bar(g) is imported into the CHP plant 10 by means of the MP steam import line 116. In the embodiment illustrated in FIG. 1, the saturated MP steam is generated by the cooling of the Fischer-Tropsch hydrocarbon synthesis reactor of the Fischer-Tropsch hydrocarbon synthesis facility integrated with the CHP plant 10. Roughly about 1700 ton/hour of MP steam is imported.

The imported MP steam, i.e. so-called Fischer-Tropsch or FT steam, is first superheated in the downstream MP steam superheater 32 to a temperature of about 244° C. If desired, superheated MP steam from the downstream MP steam superheater 32 can be exported by means of the MP steam export line 118, e.g. to the product workup section of the Fischer-Tropsch hydrocarbon synthesis facility integrated with the CHP plant 10 (attemperized with condensate if necessary as shown at 172), or during start-up of the Fischer-Tropsch hydrocarbon synthesis facility integrated with the CHP plant 10. Typically, however, during normal operation, all of the superheated MP steam from the downstream MP steam superheater 32 is further superheated in the upstream MP steam superheater 24 to a temperature of about 328° C., mixed with the HP steam turbine back-pressure exhaust MP steam in line 122 and fed, at a temperature of about 327° C., to the MP steam turbine 48 to generate about 325 MW of electricity by means of the electricity generator 50.

The upstream HP steam superheater 20 reduces the temperature of the hot flue gas from about 526° C. to about 523° C., the downstream HP steam superheater 22 reduces the temperature of the hot flue gas from about 523° C. to about 429° C., the upstream MP steam superheater 24 reduces the temperature of the hot flue gas from about 429° C. to 344° C. and the HP steam evaporator 26 further reduces the temperature of the hot flue gas to about 297° C.

As mentioned hereinbefore, the MP steam turbine 48 is a dual stage condensing turbine, receiving both MP steam and LP steam. Exhaust steam from the MP steam turbine 48 is thus fed by means of the MP steam turbine exhaust line 126 to the air condenser 52 where the steam is condensed at a pressure of about 0.14 bar(a) and at a temperature of about 52° C., using ambient air as cooling medium. Roughly 1810 ton/hour of condensate is provided by the air condenser 52 and pumped by means of the condensate pump 57 and the condensate line 128 to the condensate drum 54. Roughly 1580 ton/hour of condensate is exported from the CHP plant 10 by means of the condensate pump 58 and the condensate export line 132. In the embodiment illustrated, the condensate is exported to the condensate system of the hydrocarbon synthesis facility integrated with the CHP plant 10.

During normal operation, roughly 229 ton/hour of condensate is pumped by means of the condensate pump 60 and the condensate line 128, at a pressure of about 6.5 bar(g) to the economizer 38. In the economizer 38, the condensate temperature is raised to about 151° C., whereafter the condensate is fed into the LP steam evaporator 36 operating at a pressure of about 4.5 bar(g). The LP steam evaporator 36 produces about 62 ton/hour of saturated LP steam at a pressure of about 4.5 bar(g). The saturated LP steam is removed by the LP steam line 124 and superheated in the LP steam superheater 30 to a temperature of about 251° C. The superheated LP steam is then fed by means of the superheated LP steam line 124 to the low pressure stage of the dual-stage MP steam turbine 48.

About 166 ton/hour of condensate is pumped by the high pressure condensate pump 62, at a pressure of about 70 bar(g), from the LP steam evaporator 36 towards the HP steam evaporator 26, by means of the condensate line 130. This condensate is first heated in the economizer 34 to a temperature of about 186° C. and then in the economizer 28 to a temperature of about 280° C.

Roughly 56 ton/hour of condensate at a temperature of about 186° C. is withdrawn for use as desuperheating or attemperizing water, or for use as a water quench, as shown at 170.

As set out hereinbefore, the HP steam evaporator 26 produces roughly 110 ton/hour of saturated HP steam at a pressure of about 68 bar(g). The HP steam evaporator 26 reduces the hot flue gas temperature to about 297° C. Thereafter, the economizer 28 reduces the hot flue gas temperature to about 283° C., the LP steam superheater 30 reduces the hot flue gas temperature to about 279° C., the downstream MP steam superheater 32 reduces the hot flue gas temperature to about 212° C., the economizer 34 reduces the hot flue gas temperature to about 206° C., the LP steam evaporator 36 reduces the hot flue gas temperature to about 168° C. and the economizer 38 reduces the hot flue gas temperature further to about 140° C., with final cooling of the flue gas taking place in the stack 40 before the flue gas is released to atmosphere. Preheating of condensate in the economizer 38 is controlled in order to maintain the stack exhaust gas safely above the calculated acid and water dew points, i.e. typically above about 110° C.

In conventional fashion, boiler water, i.e. condensate (about 0.6 ton/hour) from the LP steam evaporator 36 can be blown down by means of the blowdown line 134 and boiler water (i.e. condensate) from the HP steam evaporator 26 (about 1.1 ton/hour) can be blown down, by means of the blowdown line 136, HP condensate flash drum 56, blowdown steam export line 138 and blowdown condensate line 140.

As will be apparent from the aforementioned description of the CHP plant 10, the bulk of the sensible heat contained by the expanded hot flue gas produced by the gas expansion turbine 14 and, in certain embodiments of the invention, the duct burner 18, is removed upstream of the economizer 28, i.e. by the upstream HP steam superheater 20, the downstream HP steam superheater 22, the upstream MP steam superheater 24 and the HP steam evaporator 26. In other words, all of these components or sections of the HRSG 16 provide a significant heat sink for the hot flue gas. Significantly, a predominant portion of this heat sink is provided by superheating of imported HP steam and imported MP steam upstream of the HP steam evaporator 26. As will be appreciated, any disruption in the importation of HP steam (via the HP steam import line 110) or of MP steam (via the MP steam import line 116) has the potential to cause severe problems in the HRSG 16, particularly if the CHP plant 10 is being run at its design capacity with duct burning to provide base load generation of mechanical and electrical power to one or more users thereof.

During start-up of the gas-to-liquids Fischer-Tropsch hydrocarbon synthesis facility or plant integrated with the CHP plant 10, there exists a substantial demand for electrical power and steam from the Fischer-Tropsch hydrocarbon synthesis facility (i.e. it is necessary to supply electrical power and steam to the Fischer-Tropsch hydrocarbon synthesis facility) and it is thus desirable to run the CHP plant 10 as quickly as possible at full design capacity. Unfortunately, however, during start-up of the integrated Fischer-Tropsch hydrocarbon synthesis facility, there is insufficient importation of HP steam and, in particular, MP steam from the integrated Fischer-Tropsch hydrocarbon synthesis facility, to take up their usual heat load upstream of the HP steam evaporator 26. This has the potential to cause damage to the HRSG 16 and/or to endanger personnel. For example, the mechanical integrity of the upstream HP steam superheater 20, or the downstream HP steam superheater 22, or the upstream MP steam superheater 24 may be at risk if the superheaters 20, 22 and 24 are provided with no or insufficient steam, leading to overheating of heat exchanger parts or surfaces. Furthermore, when the superheaters 20, 22 and 24 do not remove sufficient heat from the expanded hot flue gas upstream of the HP steam evaporator 26, the flue gas exchanging heat with the boiler feed water or condensate in the HP steam evaporator 26 will be at a higher temperature than normal, e.g. substantially higher than 344° C., leading to an increased production of HP steam in the HP steam evaporator 26. This may lead to the hydraulic limit of the HP steam evaporator 26 being exceeded and to possible damage to the HP steam evaporator 26. By exceeding the hydraulic limit of the HP steam evaporator 26 is meant that the heat flux into the HP steam evaporator 26 is greater than normal, and thus more HP steam is produced in the HP steam evaporator 26 than the HP steam evaporator 26 is designed to produce. As will be appreciated, this may lead to mechanical and/or thermal damage to the HP steam evaporator 26 which may lead to a catastrophic failure.

Also when the CHP plant 10 and the Fischer-Tropsch hydrocarbon facility integrated with the CHP plant 10 are running normally, each at its own design capacity, and there is a sudden process upset in the Fischer-Tropsch hydrocarbon synthesis facility, so that there is a sudden drop in imported HP steam and/or imported MP steam to the CHP plant 10, there is a risk of damage to one or more of the superheaters 20, 22 and 24, and the HP steam evaporator 26. In short, both during start-up of the Fischer-Tropsch hydrocarbon synthesis facility integrated with the CHP plant 10, and during a process upset in the Fischer-Tropsch hydrocarbon synthesis facility integrated with the CHP plant 10, there is a need to protect the HRSG 16 against too high flue gas temperatures in at least certain parts or zones of the HRSG 16, particularly upstream of the economiser 28, as a result of insufficient mass flow of HP steam and/or MP steam to the superheaters 20, 22 and 24, as the case may be.

Advantageously, when there is insufficient heat removal from the hot flue gas downstream from the gas expansion turbine 14 and the duct burner 18 but upstream of the HP steam evaporator 26 as a result of a reduction in mass flow of imported HP steam to the HP steam superheaters 20, 22, to the extent that the hot flue gas temperature downstream of the HP steam superheater 22 rises to or above a predetermined limit so that the mechanical integrity of the HRSG 16 (and in particular the mechanical integrity of the upstream MP steam superheater 24) is threatened, or to the extent that the hydraulic limit of the HP steam evaporator 26 may be exceeded, quench water is injected into the upstream HP steam superheater section 22.2 by opening the valve 164 in the quench line 162 in a controlled manner. The quench water is water with a quality sufficient to allow it to be used as boiler feed water, i.e. water conditioned for the generation of steam and may, for example, be condensate from the CHP plant 10, and in particular may be a portion of the attemperizing water withdrawn at 170. The attemperizing water is already at a pressure of 70 bar(g) and can thus easily be sprayed into a flow line connecting the downstream HP steam superheater section 22.1 to the upstream HP steam superheater section 22.2.

The purpose of the injection of quench water into the upstream HP steam superheater section 22.2 is to produce more steam and thereby to maintain the temperature of the hot flue gas immediately upstream of the upstream MP steam superheater 24 to below the mechanical design limits of the upstream MP steam superheater 24 and to ensure that there is sufficient steam flowing through the upstream HP steam superheater section 22.2 and the upstream HP steam superheater 20 to protect these heat exchangers against overheating. Importantly, the condensate injected as quench water is not merely for purposes of attemperizing the HP steam, but is for producing a significant amount of additional HP steam with a view to removing a significant quantity of heat from the hot flue gas so as to protect heat exchange equipment forming part of the HRSG 16 against too high temperatures during periods of insufficient heat removal from the hot flue gas.

As shown in FIG. 2 of the drawings, when the valve 162 is open and quench water is injected between the downstream HP superheater section 22.1 and the upstream HP steam superheater section 22.2, the HP steam generated by the HP steam evaporator 26, together with any imported HP steam that may be available, is still superheated in the downstream HP steam superheater section 22.1 from 285° C. to 425° C., after which the superheated HP steam is quenched to a temperature of about 294° C., i.e. down to about 10° C. above the saturation temperature of the HP steam. The superheated HP steam is then again superheated further in the upstream HP steam superheater section 22.2 to a temperature of about 460° C. The superheated HP steam is then attemperized to about 419° C. and then heated again to a temperature in the range of from 480° C. to about 550° C. in the upstream HP steam superheater 20 as shown in FIG. 2. In this fashion, the upstream HP steam superheater 20 is provided with sufficient steam to prevent it from running dry, the downstream HP steam superheater 22 and the upstream MP steam superheater 24 are protected against hot flue gas temperatures that are too high, and the HP steam evaporator 26 is protected from hydraulic overload, without a need for turndown of the gas expansion turbine 14 or for interrupting duct burning. The quench facility provided for the upstream HP steam superheater section 22.2 can thus be used to maintain the HRSG 16 within its design parameters while ensuring base load operation of the gas expansion turbine 14 both during start-up of the Fischer-Tropsch hydrocarbon synthesis facility integrated with the CHP plant 10, and during a process upset in the integrated Fischer-Tropsch hydrocarbon synthesis facility.

Injection of quench water (condensate) into the upstream HP steam superheater section 22.2 can be controlled in various ways. One possibility is to vary the injection of the quench water (by using the valve 164) to control the exit temperature of HP steam from the upstream HP steam superheater section 22.2, usually to a set temperature above the saturation temperature of the HP steam. Another possibility is to regulate the injection of the quench water to control the hot flue gas temperature upstream of the upstream MP steam superheater 24, or to control the temperature of the HP steam exiting from the HP steam superheater 20. A combination of these control strategies may also be used.

As will be appreciated, depending on the particular configuration of the HRSG of a CHP plant, a similar need for protection may also exist downstream of the HP steam evaporator. This is however not illustrated by the HRSG 16 shown in FIG. 1, but it is to be noted that a quench facility in accordance with the invention, located downstream of an HP steam evaporator, can also be used to protect heat exchange equipment downstream of the HP steam evaporator.

Advantageously and unusually, the HRSG 16 includes the upstream MP steam superheater 24 in a position which is upstream of the HP steam evaporator 26. The upstream MP steam superheater 24 is in addition to the downstream MP steam superheater 32. By using two MP steam superheaters 24, 32, one downstream of the HP steam evaporator 26 and one upstream of the HP steam evaporator 26, unexpected advantages are realized. Imported MP steam is superheated to a temperature of no more than 250° C. in the downstream MP steam superheater 32, and then to a temperature well above 250° C. in the upstream MP steam superheater 24. The higher superheated temperature possible for the MP steam as a result of the presence of the upstream MP steam superheater 32 increases the contribution of the MP steam to the energy production relative to conventional CHP plants. As will be appreciated, energy production from the CHP plant 10 as a result of this arrangement is however more vulnerable, compared to conventional CHP plants, to the loss of imported MP steam. This potential problem is however mitigated at least to some extent by feeding all of the available superheated HP steam (i.e. superheated HP steam that is not required for export purposes) to the HP steam turbine 44. Advantageously, compared to the approach taught in WO 2007/009951, the CHP plant 10 does not require an expensive heat exchanger to superheat MP steam by heat exchange with superheated HP steam.

The detrimental effect of a reduction in imported MP steam on power production can also be mitigated to some extent by using the duct burner 18 to generate more superheated HP steam, possibly in conjunction with quenching of the HP steam superheater section 22.2 to provide even more superheated HP steam, some of which is then let down to provide MP steam.

The provision of MP steam superheaters 24, 32 respectively upstream and downstream of the HP steam evaporator 26 reduces the HP steam generation capacity (by means of the HP steam evaporator 26) in exchange for improved MP steam quality (i.e. higher superheated temperature for the MP steam). As an example, the MP steam quality can be improved from about 0.172 MW/ton to about 0.212 MW/ton, using the arrangement described for the CHP plant 10. In the example thus illustrated by the CHP plant 10, and described in more detail hereinafter, the power production from HP superheated steam decreased by approximately 76% with the provision of two MP steam superheaters 24, 32, yet the total power production increased by approximately 4.7% compared to a CHP plant which does not employ an MP steam superheater upstream of the HP steam evaporator. Other benefits of this arrangement include that the HP steam generation capacity is reduced by about 54.6%, meaning lower costs for the HP steam generation equipment such as the HP steam evaporator 26, high pressure condensate or boiler feed water pumps and the HP steam superheaters 20 and 22, and a decrease of about 5% in heat transfer area associated with economizers and superheaters. This comparison is based on a minimum approach temperature of 15° C. It will be appreciated that the benefits of the invention will increase if the comparison is based on a maximum MP steam turbine exhaust wetness, e.g. an MP steam turbine exhaust wetness of 12% by weight, rather than a minimum approach temperature for the condenser.

The LP steam evaporator 36 used in the HRSG 16 is unusual. Although, during steady state operation of the CHP plant 10 at normal operating conditions, the LP steam evaporator 36 produces LP steam at about 4.5 bar(g), the LP steam evaporator 36 is designed to generate steam over a pressure range which overlaps with both the pressure range for LP steam and the pressure range for MP steam in the CHP plant 10. Thus, when there is no or insufficient MP steam being imported to the CHP plant 10 by means of the MP steam import line 116, for example during start-up of the Fischer-Tropsch hydrocarbon synthesis facility integrated with the CHP plant 10, the LP steam evaporator 36 is set to generate MP steam at a pressure of about 11.5 bar(g). At least some of this MP steam may be fed to the downstream MP steam superheater 32 by means of the steam transfer line 150 and the valve 152. In this way, even when there is no or insufficient imported MP steam, the downstream MP steam superheater 32 and, more importantly, the upstream MP steam superheater 24, can be wetted with MP steam.

In FIG. 2, a situation is represented where MP steam from the LP steam evaporator 36 is fed to the LP steam superheater 30 (which now functions as an MP steam superheater), but almost all of the superheated MP steam from the LP steam superheater 30 is then exported by means of the MP steam export line 118 via line 154 and valve 156, so that the LP steam superheater 30 provides a heat sink for the expanded hot flue gas, but the MP steam superheaters 24, 32 receive only sufficient MP steam (by means of the transfer line 150 and the valve 152) to wet them and provide effectively no heat sink for the expanded hot flue gas. For this reason, the MP steam superheaters 24, 32 thus do not appear in FIG. 2. In this way, both MP and LP steam superheaters in the HRSG 16 can be wetted with steam, for example, during start-up of the Fischer-Tropsch hydrocarbon synthesis facility integrated with the CHP plant 10, even though no or insufficient MP steam is being imported from the integrated Fischer-Tropsch hydrocarbon synthesis facility.

As will be appreciated, during start-up of the Fischer-Tropsch hydrocarbon synthesis facility integrated with the CHP plant 10, there will not be sufficient MP steam being imported into the CHP plant 10 to be superheated in MP steam superheaters 24, 32 or for export via line 118. Therefore, in parallel to HP steam production via the HP steam evaporator 26, the LP steam evaporator 36 is required to produce MP steam. As indicated hereinbefore, MP steam produced by the LP steam evaporator 36 is superheated in the LP steam superheater 30 after which it is exported via line 118, as is the superheated HP steam generated (via line 112). It will be appreciated that although a risk of exceeding the hydraulic limit of the LP steam evaporator 36 is present, it is not as severe as the risk associated with the HP steam evaporator 26 since the bulk of the heat is recovered by the HP steam evaporator 26, the HP steam superheaters 20, 22 and the economiser 28. If it is however necessary also to address the risk of exceeding the hydraulic limit of the LP steam evaporator 36, a quench facility downstream of the HP steam evaporator 26, can be employed, as indicated hereinbefore. The quench facility may e.g. form part of the LP steam superheater 30.

Based on the superheated MP steam demand (set by valve 156), the MP steam pressure is maintained by controlling the steam drum pressure of the LP steam evaporator 36 by modulating valve 144, i.e. as demand for superheated MP steam decreases, valve 144 opens, and when demand for superheated MP steam increases, valve 144 closes. As will be appreciated, at this time, the MP steam turbine 48 is stationary and typically isolated from the LP steam line 124 by means of a valve or the like (not shown). A portion of the generated MP steam is fed to the superheaters 32, 24 (by means of valve 152 and line 150) in order to maintain the coils wet during start-up. Alternatively, the MP steam superheater 32, 24 can be left dry, however this will require special mechanical design considerations to be included in the design of these coils, increasing costs.

Once excess MP steam becomes available for electrical power production (via the MP steam turbine 48 and the generator 50) it is then necessary to transition the MP steam generation in the LP steam evaporator 36 to LP steam generation, whereafter the LP steam generated is injected into the low pressure stage of the MP steam turbine 48. At the point when LP steam is required for the MP steam turbine 48, the valve 156 closes and valve 144 regulates the steam drum pressure down to LP steam pressure. Once the steam generation in the LP steam evaporator 36 is at LP steam pressure, the MP steam turbine 48 is ready to accept LP steam for injection via line 124. The power demand from the MP steam turbine 48 is configured in such a way that all generated LP steam is consumed for power production thus allowing valve 144 to be eventually closed. Optionally, should LP steam be required for general heating, steam tracing and other LP steam utility usages, it is possible to provide such LP steam via the LP steam blowoff line 146 and the valve 148.

Advantageously, the CHP plant 10 is also configured to let HP steam down to provide MP steam. This will assist in supplying the MP steam demand of the Fischer-Tropsch hydrocarbon synthesis facility integrated with the CHP plant 10 during start-up thereof, when the Fischer-Tropsch hydrocarbon synthesis facility is usually a net consumer of MP steam. HP steam produced by the HP steam evaporator 26 can thus be let down to the pressure of MP steam, using the steam transfer line 158 and the valve 160. Advantageously, producing MP steam in the LP steam evaporator 36 during start-up of the Fischer-Tropsch hydrocarbon synthesis facility integrated with the CHP plant 10 alleviates to some extent the steam generation requirement for the HP steam evaporator 26, during start-up of the Fischer-Tropsch hydrocarbon synthesis facility, as it is necessary to let down less HP steam to satisfy the MP steam start-up demand from the integrated Fischer-Tropsch hydrocarbon synthesis facility or plant.

A further advantage of generating MP steam in the LP steam evaporator 36 manifests itself during start-up of the CHP plant 10. Generating MP steam in the LP steam evaporator 36 during start-up of the CHP plant 10 allows electricity production from the HP steam turbine 44 and electricity generator 46 faster than when LP steam only is generated in the LP steam evaporator 36, as more HP steam is available sooner for the HP steam turbine 44. In other words, as less HP steam is required for letting down to the pressure of the MP steam for feeding into the MP steam system (i.e. into the MP steam import line 116), more HP steam is available sooner for the HP steam turbine 44.

In the embodiment illustrated in FIG. 1, the power generation capacity of the HP steam turbine 44 is about sixty six times smaller than the power generation capacity of the MP steam turbine 48. The HP steam turbine 44 will thus be the first steam turbine to generate electricity during start-up of the CHP plant 10.

There are times when the Fischer-Tropsch hydrocarbon synthesis facility integrated with the CHP plant 10, and the CHP plant 10, will be started up together. Advantageously, generation of MP steam in the LP steam evaporator 36, during simultaneous start-up of the CHP plant 10 and start-up of the of the Fischer-Tropsch hydrocarbon synthesis facility integrated with the CHP plant 10, allows power production from also the MP steam turbine 48 to occur sooner than when LP steam only is generated by the LP steam evaporator 36, as more MP steam is available faster for the MP steam turbine 48 once MP steam from the Fischer-Tropsch hydrocarbon synthesis facility integrated with the CHP plant 10 is starting to be imported into the CHP plant 10 by means of the MP steam import line 116.

Naturally, as indicated hereinbefore, once sufficient MP steam is being imported from the Fischer-Tropsch hydrocarbon synthesis facility integrated with the CHP plant 10, and generated by the LP steam evaporator 36, to drive the MP steam turbine 48, it is necessary to start reducing the control pressure of the LP steam evaporator 36 so that eventually LP steam only is produced by the LP steam evaporator 36. Typically, as indicated hereinbefore, this will require blowing off steam from the LP steam evaporator 36 until the pressure of the LP steam evaporator 36 has reduced to the LP steam set point pressure (e.g. 4.5 bar(g)). Excess MP steam generated by the LP steam evaporator 36 during this transition period may be blown off using the LP steam blow-off line 142 and the valve 144. Preferably, the excess MP steam is blown off into an LP steam header (not shown) of the Fischer-Tropsch hydrocarbon synthesis facility integrated with the CHP plant 10. Doing so ensures that condensate is not lost during excess MP steam blow-off but is recovered in the LP steam system of the Fischer-Tropsch hydrocarbon synthesis facility integrated with the CHP plant 10.

The condensate pump 60 has a variable speed drive to allow the condensate pump 60 to vary condensate flow rate through the condensate line 128 as steam production in the LP steam evaporator 36 increases or decreases and to react to the change in pressure in the LP steam evaporator 36, thereby to regulate the water level in the steam drum of the LP steam evaporator 36.

The energy efficiency of the CHP plant 10, when integrated with a conventional gas-to-liquids Fischer-Tropsch hydrocarbon facility, is illustrated in the following comparative example.

EXAMPLE

In a first case, a hydrocarbon synthesis plant converts natural gas into 30 000 barrels per day ("bpd") of liquid hydrocarbon products and produces an additional 150 MW of electrical power using the process of U.S. Pat. No. 6,673,845.

Fuel gas (which may be unconverted gas and light hydrocarbons from the hydrocarbon synthesis reactor, natural gas, refinery off gas or any combination thereof) is burned in a gas expansion turbine and electrical energy is generated. The hot flue gas exiting the turbine is used in a series of heat exchangers to generate superheated HP (7000 kPa(a)) steam. FT steam, i.e. saturated MP steam from a Fischer-Tropsch hydrocarbon synthesis reactor, is also superheated using waste heat from the flue gas. The superheated HP steam is directed to a two-stage steam turbine. In the first stage the HP steam is expanded to match the pressure of the superheated FT steam (MP steam). FT steam (MP steam) is then injected into the second stage of the steam turbine along with the expanded steam. 350 t/h of FT steam is available for power generation.

The overall efficiency of the power generation in the CHP plant 10, including the power generated by the steam turbine, is determined by the equation:

Total power produced (MW)/Total duty of fuel gas consumed (MW)=((Power produced by gas turbine expander and steam turbine−Power consumed by air compressor))/Fuel gas duty When including for stream turbines, the process of U.S. Pat. No. 6,673,845 was calculated to be 61.0% efficient. In other words, only 246 MW of fuel gas is required to produce 150 MW of electrical power. According to U.S. Pat. No. 6,673,845, when steam turbines are not considered, the process is calculated to be only 32% efficient, i.e. in order to produce 150 MW of electrical power, 469 MW of fuel gas is required.

In a second case, a hydrocarbon synthesis plant converts natural gas into 30 000 bpd of liquid hydrocarbon products and produces an additional 183 MW of electrical power using a CHP plant having the same features as the CHP plant 10 in accordance with the invention.

The CHP plant in accordance with the invention, when integrated with a conventional gas-to-liquids Fischer-Tropsch hydrocarbon facility, was calculated to be 67.6% efficient. In other words, only 270 MW of fuel gas is required to produce 183 MW of electrical power.

Furthermore, the use of two MP steam superheaters, one upstream of the HP steam evaporator and one downstream of the HP steam evaporator, compared to a single MP steam superheater downstream of the HP steam evaporator, as taught by U.S. Pat. No. 6,673,845, was calculated to result in a 4.7% increase in overall gross electrical power output which equates to a 1.5% improvement in the thermal efficiency of the CHP plant.

In determining the quantitative improvement of the present invention over U.S. Pat. No. 6,673,845, the feed and steam qualities to the CHP plant 10 as well as the total fuel consumption of the CHP plant 10 were kept constant. Due to the introduction of the upstream MP superheater 24 this allowed for a higher degree of MP superheat than would otherwise be the case if only one MP steam superheater is included (e.g. the downstream MP steam superheater 32), as is the case in U.S. Pat. No. 6,673,845.

The improvement was calculated on the basis that if a higher degree of MP steam superheat is available then a lower condensing temperature in the air condenser 52 is possible, subject to a maximum allowable steam turbine exhaust wetness. The limit was assumed to be 12% wt.

In the case where only the downstream MP steam superheater 32 is included, i.e. a configuration similar to that in U.S. Pat. No. 6,673,845, the air condenser 52 is able to condense the MP steam turbine exhaust stream 126 to a temperature as low as 48° C. before exceeding the wetness limit.

In the case according to the present invention where both the upstream and downstream MP steam superheaters 24, 32 are included, due to the higher degree of MP steam superheat attainable, a much lower condensing temperature is achievable in the air condenser 52, and hence there is an increase in power output for the same fuel and steam input. In the dual MP superheater case, a minimum condensing temperature of 40° C. was determined to be practically achievable and produced a steam turbine exhaust gas wetness of about 10% wt. It will be appreciated that if a water-cooled condenser were employed, the exhaust gas wetness could be increased, thus allowing for even more power to be generated.

The invention claimed is:

1. A method of operating a combined heat and power plant (CHP plant), which is steam-integrated with one or more facilities configured to export steam to the CHP plant, the CHP plant comprising one or more HP steam turbines to generate power and one or more MP steam turbines to generate power, the method comprising:
   importing MP steam from one or more of said facilities steam-integrated with the combined heat and power plant;
   generating hot flue gas in a hot flue gas generator;
   cooling the hot flue gas in a sequence of cooling steps to recover heat and to generate steam in a heat recovery steam generator (HRSG), said cooling of the hot flue gas comprising superheating said imported MP steam, the heat recovery steam generator comprising:
   a high pressure (HP) steam evaporator downstream of the hot flue gas generator in which HP steam is generated and in which the hot flue gas is cooled;
   at least one HP steam superheater between the hot flue gas generator and the HP steam evaporator in which at least HP steam from the HP steam evaporator is superheated and in which the hot flue gas is cooled;
   a first medium pressure (MP) steam superheater in which said imported MP steam is superheated by the hot flue gas and in which hot flue gas is cooled, the first MP steam superheater being upstream of the HP steam evaporator and downstream of said at least one HP steam superheater so as to receive flue gas cooled by said at least one HP steam superheater; and
   a second MP steam superheater downstream of the HP steam evaporator in which said imported MP steam is superheated by the hot flue gas and in which hot flue gas is cooled;
   and wherein said imported MP steam is supplied to the first and second MP steam superheaters with the second MP steam superheater heating said imported MP steam to a first superheated temperature and the first MP steam superheater heating said imported MP steam further to a second superheated temperature which is higher than the first superheated temperature, and wherein the power produced by the one or more MP steam turbines is at least the same or more than the power produced by the one or more HP steam turbines.

2. The method according to claim 1, wherein the imported MP steam is fed to the second MP steam superheater downstream of the HP steam evaporator, before at least a portion thereof is fed to the first MP steam superheater upstream of the HP steam evaporator.

3. The method according to claim 1, wherein the CHP plant exports superheated MP steam from the second MP steam superheater downstream of the HP steam evaporator to said one or more facilities configured to export steam to the CHP plant, or wherein the CHP plant comprises at least one MP steam turbine fed with superheated MP steam from the first MP steam superheater upstream of the HP steam evaporator.

4. The method according to claim 1, wherein HP steam is imported to the HP steam superheater, the method further comprising, when there is insufficient heat removal from the hot flue gas downstream from a hot flue gas generator generating said hot flue gas but upstream of the HP steam evaporator as a result of insufficient mass flow of imported HP steam to the HP steam superheater, to the extent that the hot flue gas temperature downstream of the HP steam superheater will rise or rises to or above a predetermined limit, quenching steam inside the HP steam superheater or steam being fed to the HP steam superheater by injecting boiler feed water or condensate into said steam to produce steam in the HP steam superheater thereby to increase the removal of heat from the hot flue gas and hence to reduce the hot flue gas temperatures downstream of the HP steam superheater.

5. The method according to claim 1, wherein the HRSG comprises a low pressure (LP) steam evaporator downstream of the HP steam evaporator to generate LP steam, and wherein, when no or insufficient MP steam is being imported to the first MP steam superheater to ensure safe operation of the first MP steam superheater, or when a demand exists for exporting MP steam which cannot be satisfied by imported MP steam superheated in the first or second MP steam superheater, or when a demand exists for MP steam in the CHP plant which cannot be satisfied by imported MP steam, operating the LP steam evaporator at an operating pressure in the range of between 8 bar(g) and 18 bar(g) to generate MP steam to wet the MP steam superheaters or to satisfy at least to some extent said demand for MP steam; and thereafter, when sufficient MP steam is being imported to the MP steam superheaters from external of the CHP plant to ensure safe operation of the MP steam superheater, or when any demand for exported MP steam is satisfied by imported MP steam which is superheated in the first or second MP steam superheaters and then exported, or when there is no more demand for exporting of MP steam, or when the demand for MP steam in the CHP plant is being satisfied at least to some extent by imported MP steam, reducing the operating pressure of the LP steam evaporator to a pressure in the range of between 2 bar(g) and 8 bar(g) thereby to generate LP steam.

6. A combined heat and power plant (CHP plant), which is steam-integrated with one or more facilities configured to export steam to the CHP plant, the CHP plant comprising:

one or more HP steam turbines to generate power and one or more MP steam turbines to generate power;

a hot flue gas generator generating hot flue gas;

a heat recovery steam generator (HRSG) downstream of the hot flue gas generator to cool hot flue gas in a sequence of cooling steps to recover heat and to generate steam, said cooling of the hot flue gas including superheating MP steam imported from one or more of said facilities configured to export steam to the CHP plant, the HRSG comprising:

a high pressure (HP) steam evaporator downstream of the hot flue gas generator to generate HP steam from heat recovered from the hot flue gas;

at least one HP steam superheater between the hot flue gas generator and the HP steam evaporator to superheat at least HP steam from the HP steam evaporator with heat recovered from the hot flue gas;

at least one first medium pressure (MP) steam superheater upstream of the HP steam evaporator and downstream of said at least one HP steam superheater to receive flue gas cooled by said at least one HP steam superheater to superheat said MP steam imported from one or more of said facilities configured to export steam to the CHP plant with heat recovered from the hot flue gas; and at least one second MP steam superheater downstream of the HP steam evaporator to superheat said MP steam imported from one or more of said facilities configured to export steam to the CHP plant with heat recovered from the hot flue gas;

wherein the CHP plant is configured to supply said MP steam imported from one or more of said facilities configured to export steam to the CHP plant to said at least one first and second MP steam superheaters, wherein said at least one second MP steam superheater is configured to superheat said imported MP steam to a first superheated temperature and said at least one first MP steam superheater is configured further to heat said imported MP steam to a second superheated temperature which is higher than the first superheated temperature, and wherein said one or more MP steam turbines and said one or more HP steam turbines are sized such that the power produced by the one or more MP steam turbines is at least the same or more than the power produced by the one or more HP steam turbines.

7. The combined heat and power plant according to claim 6, which is configured to feed the imported MP steam to said at least one second MP steam superheater downstream of the HP steam evaporator, and which is configured to feed at least a portion of the steam from said at least one second MP steam superheater downstream of the HP steam evaporator to said at least one first MP steam superheater upstream of the HP steam evaporator.

8. The combined heat and power plant according to claim 6, which is configured to export superheated MP steam from said at least one second MP steam superheater downstream of the HP steam evaporator to said one or more facilities configured to export steam to the CHP plant.

9. The combined heat and power plant according to claim 6, which comprises a quench facility in flow communication with the HP steam superheater and with a supply of boiler feed water or condensate, the quench facility being configured to quench HP steam inside the HP steam superheater or HP steam being fed to the HP steam superheater by boiler feed water or condensate injection into said HP steam, the steam superheater thus being configured to produce HP steam thereby in use to increase the removal of heat from the hot flue gas and hence to reduce the hot flue gas temperatures downstream of the HP steam superheater.

10. The combined heat and power plant according to claim 6, which comprises a low pressure (LP) steam evaporator downstream of the HP steam evaporator configured to generate LP steam, the LP steam evaporator being operable to generate steam throughout a pressure range of from 2 bar(g) to 18 bar(g) and the LP steam evaporator being provided with a control system configured to be selectively settable to control the pressure of the LP steam evaporator so that one of LP steam within an LP pressure range and MP steam within an MP steam pressure range can selectively be generated by the LP steam evaporator.

11. The method according to claim 1, further comprising importing HP steam from one or more of said facilities configured to export steam to the CHP plant.

* * * * *